June 14, 1955    H. A. QUIST    2,710,625
PRESSURE RESPONSIVE ACTUATED VALVES
Filed March 27, 1952    6 Sheets-Sheet 1

INVENTOR.
HAROLD A. QUIST
BY
Busser, Smith and Harding
ATTORNEYS

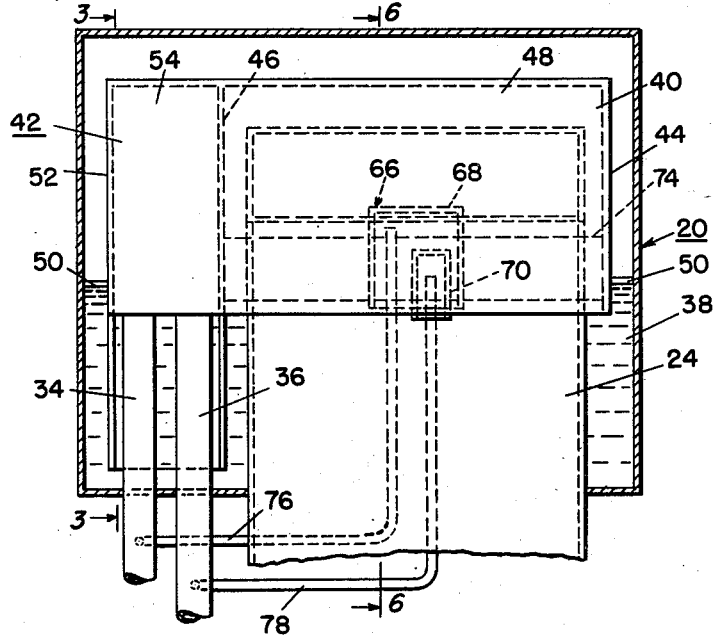
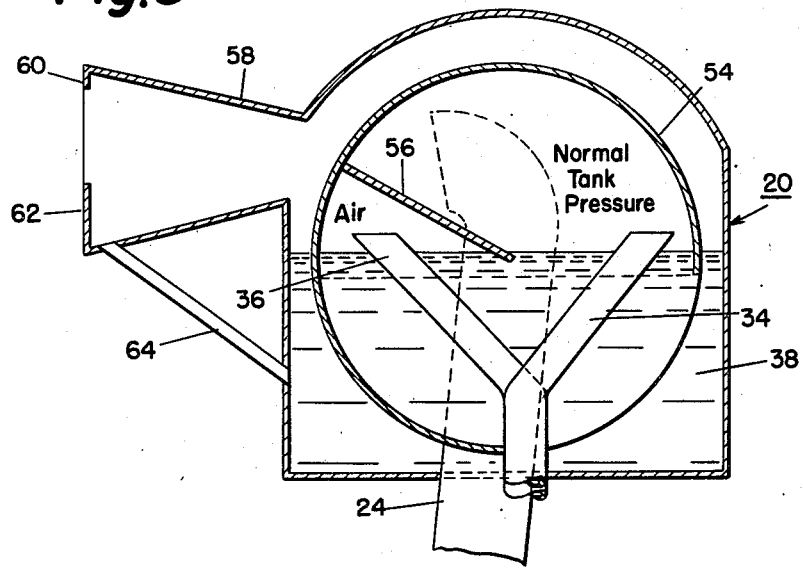

INVENTOR.
HAROLD A. QUIST
BY
ATTORNEYS

June 14, 1955  H. A. QUIST  2,710,625
PRESSURE RESPONSIVE ACTUATED VALVES
Filed March 27, 1952  6 Sheets-Sheet 4

INVENTOR.
HAROLD A. QUIST
BY
Busser, Smith and Harding
ATTORNEYS

*INVENTOR.*
HAROLD A. QUIST

ATTORNEYS

June 14, 1955     H. A. QUIST     2,710,625
PRESSURE RESPONSIVE ACTUATED VALVES
Filed March 27, 1952     6 Sheets-Sheet 6

INVENTOR.
HAROLD A. QUIST
BY
Busser, Smith and Harding
ATTORNEYS

United States Patent Office 2,710,625
Patented June 14, 1955

2,710,625

PRESSURE RESPONSIVE ACTUATED VALVES

Harold A. Quist, Swarthmore, Pa., assignor to Sun Oil Company, Philadelphia, Pa., a corporation of New Jersey Application March 27, 1952, Serial No. 278,823

7 Claims. (Cl. 137—248)

This invention relates to pressure operated devices in general and more particularly to pressure responsive valves adapted to relieve excessive pressure and vacuum conditions arising in vessels used for the storage of volatile liquids.

Pressure responsive valves cooperating with a venting conduit and a liquid seal comprise familiar and widely used elements for pressure relief. Normally this basic form of relief valve is operated in direct response to the pressure differential resulting between the tank pressures transmitted to the valve member and the tendency to remain stationary due to inertia and friction resistance. Consequently, the usable pressure developed in the storage tank is always reduced by an amount required to overcome these restraining components. It is an object of this invention to provide a venting device in which the storage tank pressure is used as the operating medium at substantially its full force and the effect of the restraining force components reduced to a minimum.

In an effort to avoid "chattering" and "hunting," yet preserve the storage equipment and the volatile constituents of the stored liquid, counterbalancing weights, accelerating mechanisms, and force increasing elements both mechanically and pressure actuated, have been developed. The pressure actuated valves, toward which this invention is directed as an improvement, are most satisfactorily operated by actuators regulated to respond to the excess pressures in the storing receptacle. In general, the excess tank pressures, either as pressure or vacuum relative to atmospheric pressure, are operatively selected relative to each other and the atmosphere by such an actuating mechanism. For example, excess tank pressure operates against atmospheric pressure, while atmospheric pressure operates against the excess vacuum condition.

By using such actuators, responsive to tank conditions, to select and transmit these cooperating pressures for predetermined relieving or venting conditions, the sealing valve is properly controlled. Various types of actuating sub-combinations together with especially designed valve members have been suggested to meet specific problems of volatile liquid storage. The resulting device is usually a complex mechanism of pressure receiving and pressure responsive elements associated with a sealing valve member. It is an object of this invention to provide a simplified form of reverse pressure operated vent valve retaining all the desirable pressure and vacuum relieving characteristics of the more complex types.

Under normal operating conditions, relief valves of the liquid seal type require careful maintenance. The substitution and utilization of reversible pressures available in the storage tank to which the valve is attached, and the atmosphere, have eliminated the attention previously required by gummed or frozen mechanical linkages. The liquid which affords the sealing medium in this form of valve is, however, still subjected to entrainment in the relieving gas during venting operation. As the valve member lifts from the liquid seal, the drops of liquid returning to the seal body as caught in the rush of relieving gas and carried away. It is a further object of this invention to provide a wiping means to cooperate with the valve member to reduce the quantity of liquid subjected to the movement of the relieving gases.

The present invention includes a valve member pivotally suspended in a housing for oscillating movement into contact with a cooperating liquid seal. In connected operating relation to the valve member, a pressure responsive mechanism is suspended to oscillate the valve member in response to transmitted pressures. The valve oscillation for the relief of either excess pressure or vacuum conditions is always in one direction which reduces the design of this element to its simplest form.

Connected between the storage tank to be relieved and the pressure responsive mechanism coupled to the relieving valve, a single reciprocating pressure actuator is used to reverse the differential pressures and operate the valve. The reasons for using actuators for the reversal and selection of predetermined pressures is first to operate the valve in one direction and second to eliminate "hunting" and "chattering" by making the actuating forces specific and positive. The single actuator is connected to transmit normal and vacuum conditions arising in the storage tank with no change in position of the operating parts, and to reverse the actuating pressures delivered to the valve under excessive pressure conditions in the storage tank by responsive movement.

For a more complete understanding of the nature and scope of the invention in which the above noted objects and others will be evident, reference is made to the following detailed description read in connection with the accompanying drawing in which:

Figure 2 is an elevational view in section of Figure 1 along line 2—2.

Figure 3 is an elevational view in section of Figure 2 along line 3—3.

Figures 7 to 10 inclusive are operational views based on Figures 1 to 6 inclusive showing relative positions of elements under excess pressure and vacuum relieving conditions.

The general requirements of all vacuum venting and pressure relieving combinations are that they preserve the storage equipment and retain as much of the volatile stored material as possible. Therefore the operating responses, of such apparatus must be positive and sharply accentuated, performed under predetermined and selected conditions in order to fulfill these requirements satisfactorily. Uncontrolled operation of a venting mechanism within reasonably wide pressure and vacuum limits will preserve the equipment from destruction but will not be economical in the conservation of the volatile stored constituents. Consequently, the positive control of devices of the type considered here must be possible within predetermined and comparatively narrow limits of both pressure venting and vacuum relief.

As has been indicated above, the terms of "pressure" and "vacuum," unless otherwise defined, are used to indicate pressure ranges, respectively, above and below normal atmospheric pressure. The relief of these conditions arising in storage vessels is limited to excesses of positive and negative pressures. This is clear when it is understood that due to pumping operations and temperature changes, to name two affecting conditions, there is always a pressure existing in a sealed storage vessel either above or below atmospheric, frequently not amounting in force to the excess requiring relief. A balanced or normal pressure exactly equal to the atmospheric pressure outside the tank is evidently the exception rather than the rule.

Figure 1:
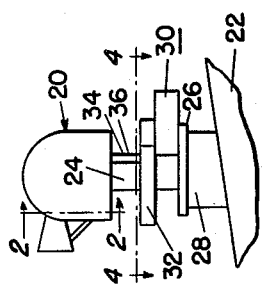
Figure 1 is an elevational view showing the device in operating position.

Referring now to the drawing for a more detailed description of the invention where like numerals designate like elements throughout the figures, Figure 1 shows the device mounted on the top of a storage vessel ready for operation. A valve housing 20 is mounted above a storage vessel 22 in sealed relation to the supporting relief gas flue 24. In the illustration, the relief gas flue 24 is shown connected to the cover 26 of a conventional manhole 28 as an acceptable way of fastening it to the storage tank 22. Other and varied ways are readily visualized for connecting the valve housing to the vapor or pressure space of the storage tank 22, any of which may be acceptable.

On top of the manhole cover 26 an actuator generally designated by number 30 is positioned. As thus shown, the tank pressure and excess vacuum transmitting conduit 32 (distinguished from the excess pressure condition) embraces the flue 24 as detailed in Figure 4. A pair of pressure transmitting conduits 34 and 36, better shown in other figures of the drawing, Figure 4 for example, complete the visible components of Figure 1.

Figure 4:
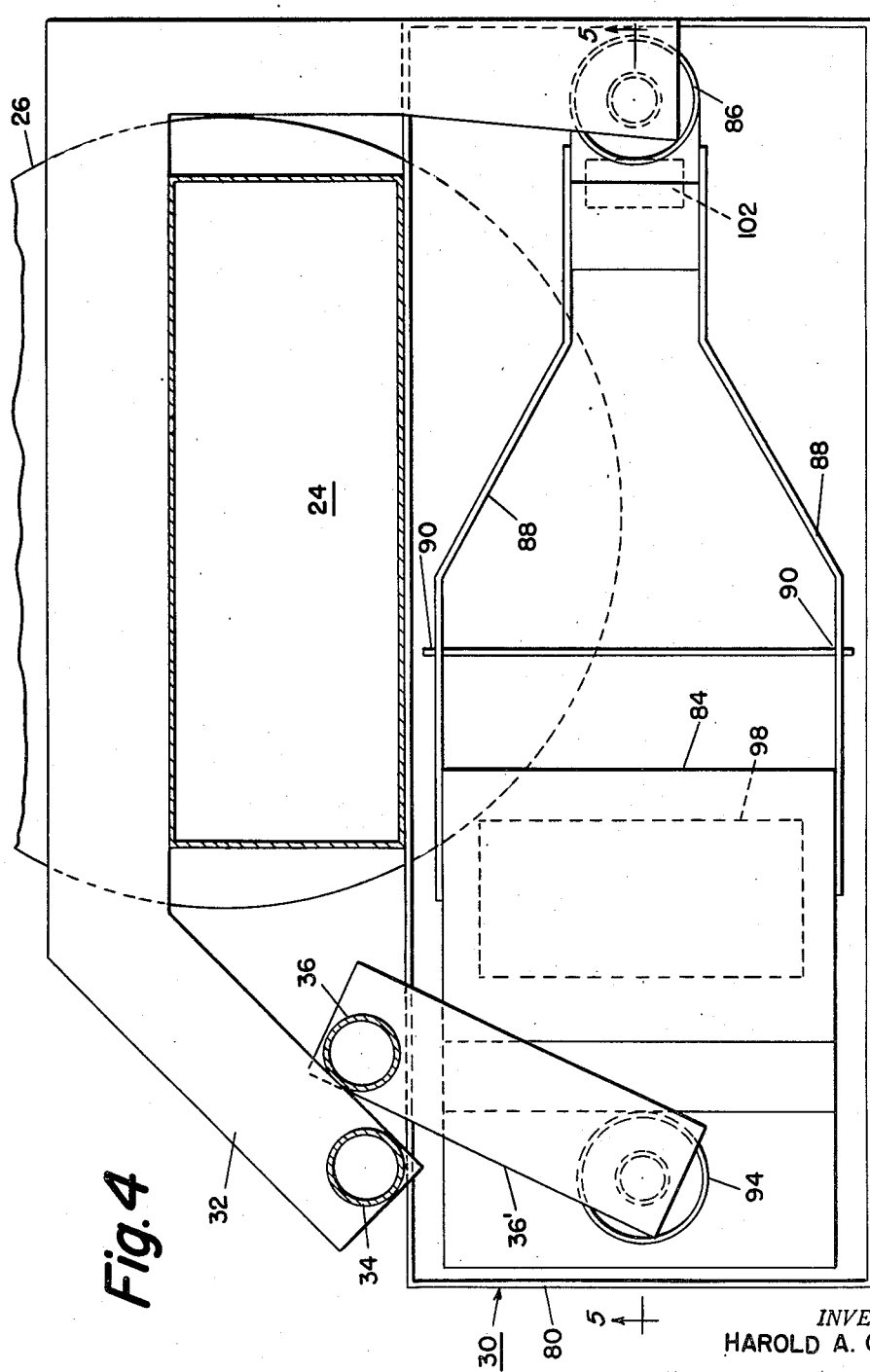
Figure 4 is a plan view in section of Figure 1 along line 4—4.

The description so far, mostly confined to Figure 1 with reference to Figure 4 for clarity, includes the major parts of the invention. With the exception of the operating elements within the housing 20 and the actuator 30, the relative positions of these major parts of the device may be changed as desired and need not be assembled as shown for satisfactory operation. Further, the actuating mechanism 30, later described in detail, can be used to operate two or more valves such as those generally designated by the number 20 or similarly detailed signal devices, valves, pumps and the like.

Figure 6:
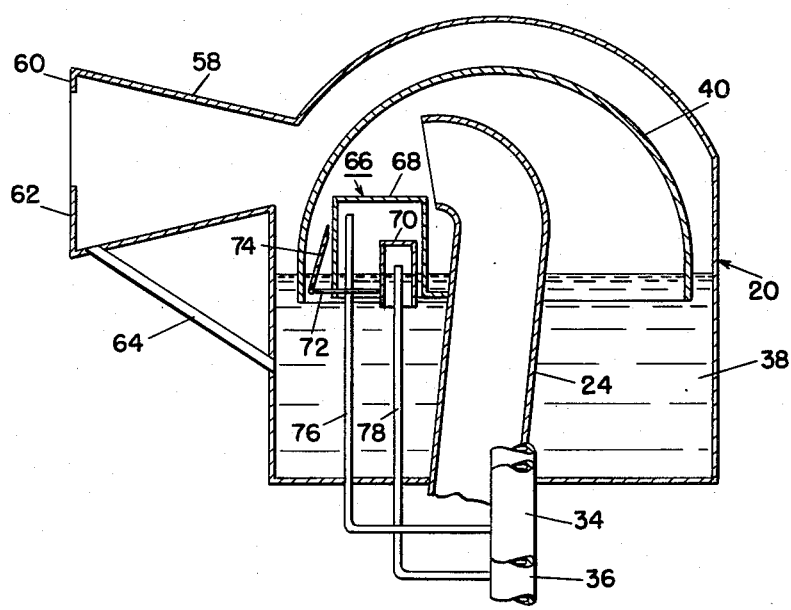
Figure 6 is an elevational view in section of Figure 2 along line 6—6.

Reference to Figures 2, 3 and 6 in connection with Figure 1 shows the interior of the valve housing 20 and the included elements. A liquid seal 38 is supported in the housing 20 at sufficient depth to receive the engaging edges of the valve member 40. In cross section as seen in Figure 6, this valve member 40 may be considered as semi-cylindrical in shape. Within the housing it is closed on one end by a semi-cylindrical plate 44 and on the other by a full cylindrical plate 46 which together with plate 44 supports the cover plate 48 and separates the pressure responsive mechanism 42 from the valve member. This member is suspended to oscillate in the housing on pivots 50—50 mounted in prolongation of its axis and in position therein to enclose the relief gas flue 24 in sealing relation with the liquid.

The two necessary views to understand the pressure responsive mechanism 42 in the simple form illustrated are shown in Figures 2 and 3. The full circular plate 46 used to close one end of the valve member 40 and support cover plate 48 is duplicated as end plate 52. A cover plate 54 is fabricated to attach to the circular plates 46 and 52 on their perimeters leaving an opening of approximately a quadrant which is positioned to remain submerged in the sealing liquid in all operating positions. This opening is fully illustrated in the figures now being considered and admits the conduits 34 and 36 to the mechanism in proper operating position. In Figure 3, conduit 34 is directed to open above the liquid level to one side of the fixed baffle 56 as conduit 36 is bent to open on the opposite face of the baffle. The relief gas flue 24 is shown in its narrower dimension as hidden by the pressure responsive mechanism and projecting upward to open above the sealing liquid under the cover plate 48 of the semi-cylindrical valve member 40.

Before considering the operating elements of the single actuator 30 used in this combination, the sealing liquid conservation features will be disclosed. As these features include modifications in design and further combinations of elements properly belonging to the housing 20, their disclosure will logically complete this section of the device. Figure 6, considered with Figures 2 and 3, will be used as references.

A covered vent 58 projects from the valve body 20 along the flow direction normally assumed by relief gases either escaping from the flue 24 to vent excess pressure, or air flowing into the flue to relieve excess vacuum conditions. The upper part of flue 24 is curved to direct or receive this flow and is positioned relative to vent 58 to reduce turbulence of the relieving gases to a minimum. In Figure 2, the vent 58 is not shown in order to avoid confusion, but will be considered as extending across the width of the valve body 20 to gain the maximum opening.

Under normal storage conditions, the greatest and most frequent requirement is found to be the venting of excess pressures. The greatest loss of volatile components is experienced in this condition, which is easily recognized. A normal relief of vacuum conditions does not remove any of the volatile constituents from the storage vessel. Consequently the features of the housing which attempt to control the volume and velocity of the relieving gases are most influenced by the pressure venting requirements rather than vacuum relief.

The covered vent 58 is flared from the connection with the housing 20 to reduce the velocity of the escaping excess pressure gases as they are released in operation of the valve, to be explained later. A smaller opening than the flared end along the length of the vent 58 forms an upper baffle 60 and a deeper lower baffle 62. These further retard the velocity of the outwardly moving storage vessel gases and cause a turbulence resulting in dropping the entrained particles of sealing liquid. The pipe connector 64 receives these accumulated particles for return to the body of the liquid 38.

As will be fully understood after reading the description of the operation of this device later in this specification, the valve member 40 is oscillated in only one direction to relieve excess of either pressure or vacuum. There is, consequently, only one edge of the cover plate 48 on the valve member which is lifted from engagement with the sealing liquid. In the views of this element shown in the drawings, the valve is made to open to relieving position by oscillating in a clockwise direction. The disengaging or trailing edge of the valve member is shown between the flue 24 and the vent 58 as the barrier which seals on returning after a relieving operation to the normal position of contact with the sealing liquid.

To reduce the quantity of sealing liquid dripping from the trailing edge of the valve member 40 as it oscillates into relieving position, a wiper mechanism generally indicated by the numeral 66 is positioned to engage this edge. A fixed inverted cup 68 is positioned within the body of the valve member 40 and is supported by fastening it to the flue 24 as shown. Longitudinally it is positioned as indicated in Figure 2, and may be made sufficiently long as a single element or separated into several spaced elements as required by the mechanism it subtends.

A second and movable cup 70 is inverted within the fixed cup 68 and is supported by the hinged bracket 72, rigidly fastened at the hinge point to the wiper blade 74. This form of construction lends itself easily to one or a combination of several of the cup sections. It is required, to secure maximum benefits, to extend the wiper blade 74 along the full length of the trailing edge of the valve member. This requirement may necessitate more than one movable cup element.

Leading to the fixed and movable cups 68 and 70 respectively, extension conduits transfer the operating pressures of the storage tank and atmosphere to excite the wiper blade. The extension conduit 76 connects the pressures existing in conduit 34 to operate in the volume of fixed cup 68 above the sealing liquid surface. Extension conduit 78 conducts the pressures in conduit 36 under the inverted movable cup 70 above the liquid surface. The movable cup 70 is, therefore, internally and externally subjected to pressures selected and controlled by the actuator 30 which is yet to be considered.

Figure 5:
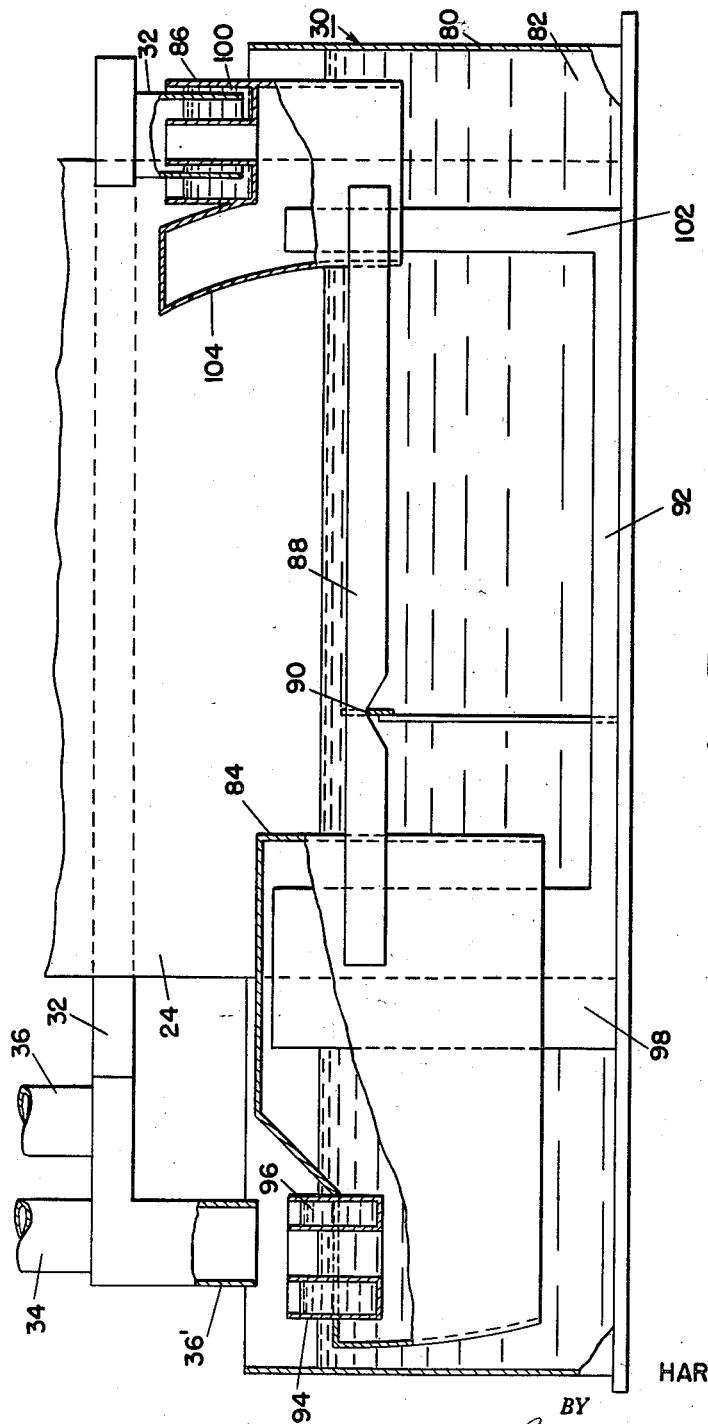
Figure 5 is an elevational view in section of Figure 4 along line 5—5.

For descriptions of the elements comprising the actuator 30 and their relation to each other, reference is made to the sectional plan view of Figure 4 and the sectional elevation view of Figure 5. The general description of the whole device, as given above in connection with Figure 1, indicated the position of the actuator in the presently considered combination, and mentioned the location and purpose of the conduits 34 and 36 as related to this actuating component. Further, the vacuum transmitting conduit 32 extending from one end of the actuator to engage conduit 34 has been mentioned.

The body 80 of the actuator 30 is adapted to support a volume of sealing liquid 82. An oscillating member includes a pressure responsive inverted cup 84 on one end and a sealing connector 86 on the other end. The cup 84 and connector 86 are connected by arms 88—88 arranged to engage a pivotal support 90 positioned between the cup and connector. A single pressure transmitting conduit 92 open to receive storage tank pressures is branched to open under the cup and connector respectively above the level of the sealing liquid 82.

Positioned to make sealing connection with the conduit 36, or an extension 36' of this conduit as shown in Figures 4 and 5, a sealing connector 94 forms a part of the inverted cup 84. As shown, the connector 94 is adapted to contain a sealing medium 96 for receiving the extension of conduit 36 in sealing engagement. The sealing medium may be a liquid for normal pressure ranges or a soft gasket material for higher pressure transfers where the liquid might be blown from the connector. The branch 98 of the conduit 92 passes through the liquid and opens into the inverted cup 84 above the liquid level. Under normal and vacuum relieving conditions the actuator 30 assumes the position shown in Figure 5 which seals the branch conduit 98 and opens conduit 36 to receive air at atmospheric pressure.

The connector 86 on the opposite end of the pivotally suspended arms 88 from the inverted cup 84 is adapted to engage conduit 34 through the conduit 32. It should be emphasized at this point that the extension 36' and the conduit 32 represent one solution for an efficient arrangement of the elements of this invention. It may be practical to eliminate these additional conduits and present the ends of conduits 34 and 36 directly for engagement with the sealing connectors 86 and 94 respectively. Whatever solution is adopted, the sealing medium 100 in connector 86 may follow the medium used as 96 or may be a liquid for all conditions as only vacuum conditions and not excess pressures are transmitted through this connection. To complete the detail on this end of the oscillating element in the actuator 30, the connector 86 is shaped to receive, transmit and seal the branch 102 of the conduit 92 which enters it above the level of the sealing liquid 82. The exact function of these elements and their operating relation will be detailed in discussing the operation of the device.

Figure 8:
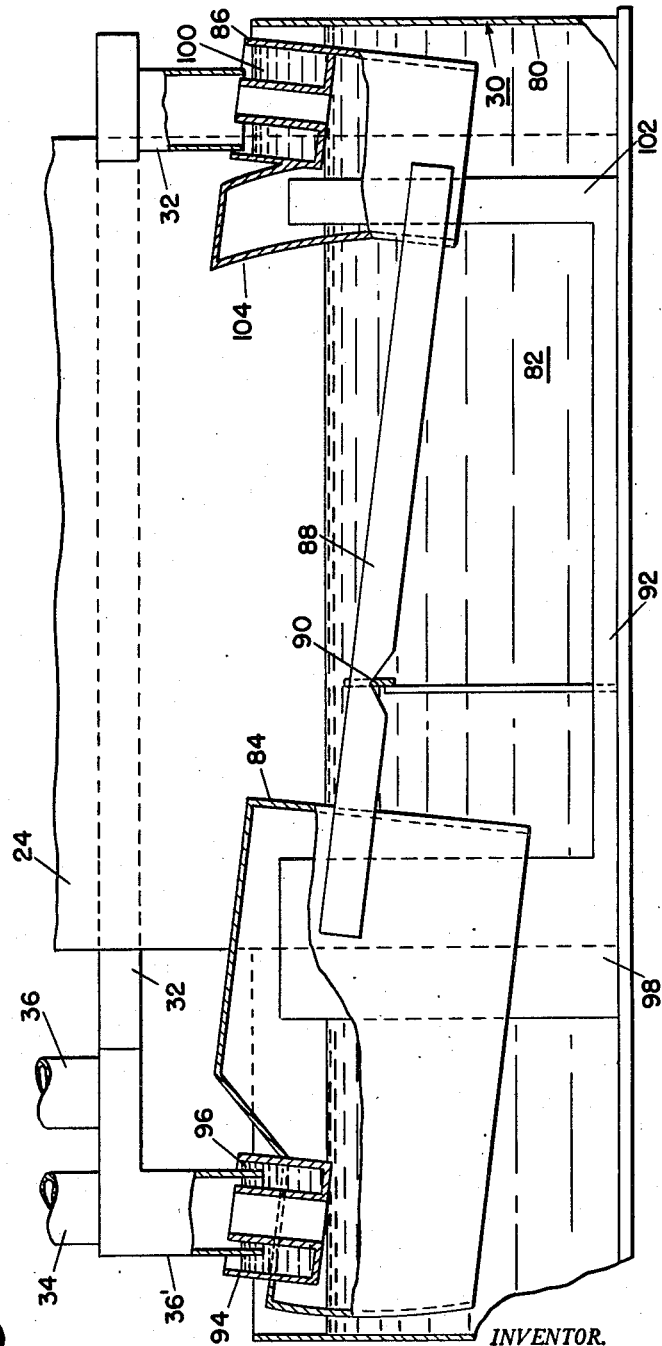
Figure 9:
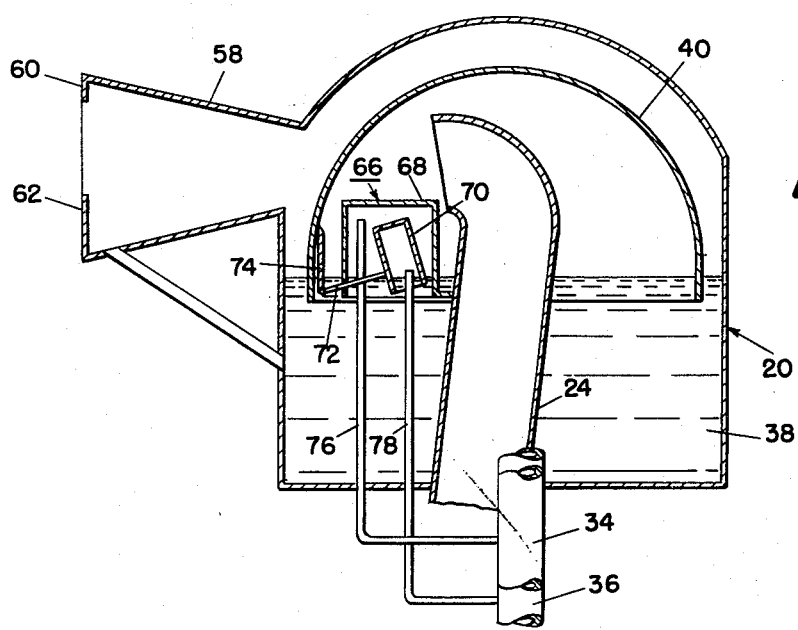
Figure 7:
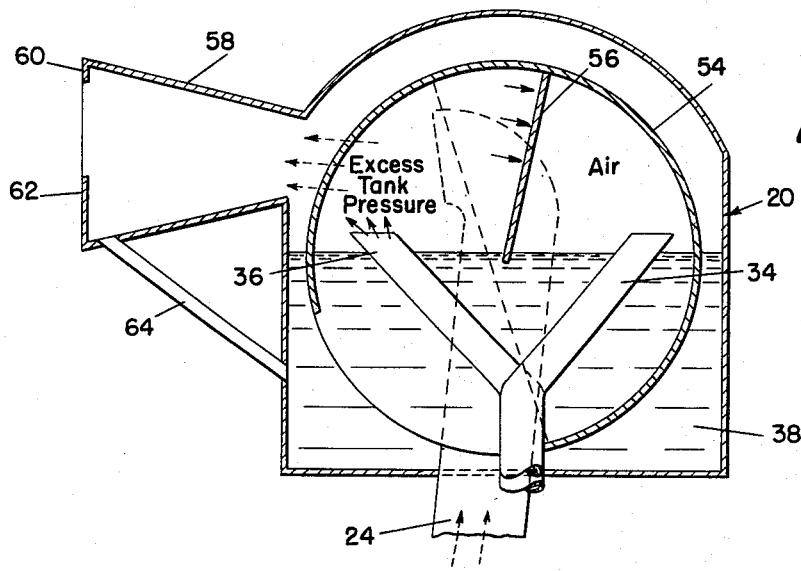

The basis for discussing the operation of the illustrated pressure operated relief valve is found in Figures 2, 3 and 6 which show the position of the valve elements in the normal or non-relieving position. Figures 4 and 5 show the actuator 30 in the position it occupies in both the normal or non-relieving position, as well as in the vacuum venting position, which is the same and is an outstanding feature of this device. Figures 7, 8 and 9 with incidental reference to Figures 1 through 6 will be used in describing the excess pressure venting operation. The vacuum relief operation will then be readily explained by reference to Figures 5 and 10.

Generally, the three separate conditions of complete operation, namely the normal or non-relieving condition, the excess pressure condition and the excess vacuum condition, are met with minimum operating movement. A similar oscillating movement of the valve member 40 from the normal position relieves either excess pressure condition. The valve movements are in response to only one oscillating movement of the actuator 30 which reverses and selects the differential pressures required to accomplish both relieving operations. This general statement of the operational advantages of the disclosed relieving valve will be fully understood after reading the following description of the excess pressure and excess vacuum relief operations.

Starting from the non-relieving position of the elements in Figures 2, 3, 5 and 6, the normal tank pressures not forceful enough to require relieving are transmitted through branch 102 of conduit 92, connector 86 to conduits 32 and 34 to the closed space in the pressure responsive mechanism 42, opposed to the opening direction. Except for excess vacuum conditions in this sector of the pressure responsive mechanism, any pressure equal to or greater than atmospheric will hold the valve member securely sealed over the flue 24, which is also transmitting the tank pressure condition beneath the valve. This condition of pressures eliminates the requirement for weights to hold the valve in the sealed position.

Where vacuum conditions do exist, they are transmitted to both the valve member and the pressure responsive mechanism. The actuator 30 is designed to transmit the necessary operating excesses of both vacuum and pressure to the responsive mechanism 42. An excess vacuum requires no movement of the actuator 30 for operating transmission. For excessive pressure conditions the actuator 30 is oscillated and selects the operating pressures for transmission to the responsive mechanism.

A detailed consideration of the condition of excess tank pressure shows that although this condition is transmitted immediately to the enclosed body of the valve member 40, it is consequently not effective to oscillate the valve. The oscillation of the actuator 30 is necessary. The tank pressure is transmitted through conduit 92 and the branches 98 and 102 to the inverted cup 84 and the connector 86. The respective areas of the cup and connector are so related that the actuator oscillates to close the connection of the connector 94 and the conduit extension 36' to transmit the full tank pressure through conduit 36 as shown in Figure 8. As this oscillation takes place, the connector 86 is disengaged from conduit connection 32 and opens the conduit 34 to the atmosphere. Branch conduit 102 is enclosed in a separate leg 104 of the connector 86 which seals this branch by immersion in the sealing liquid. As the result of this oscillation of the actuator moving member, conduit 36 is connected directly to the excess pressure in the storage tank and conduit 34 is connected to atmosphere.

Reference to Figure 7 illustrates the condition in the pressure responsive mechanism in contrast with the normal condition shown in Figure 3. The effective excess tank pressure shown by heavy arrows is confined to the space between the sealing liquid surface and the baffle 56. The full tank pressure is thus admitted by operation of the actuator to become effective in the movement of the baffle. The responsive oscillation against gas or air pressure escaping through open conduit 34 rotates the hollow valve member 40 into a venting position as shown by the dotted line crossing the curved end of the flue 24. Tank pressure shown by dotted arrows is vented into the housing 20 and out to the atmosphere through the vent 58.

As the valve member 40 oscillates in response to the pressure activated section 42 peripherally connected to it, the trailing edge lifts from the liquid seal. The excess tank pressure in conduit 36 is transmitted through connecting conduit 78 to the hollow body of the movable cup 70 in the wiper mechanism as shown in Figure 6. Air at atmospheric pressure is transmitted to the interior of fixed cup 68 from conduit 34 through connecting conduit 76 to form the differential pressure. The upward movement of cup 70 rotates the wiper blade 74 into engagement with the moving trailing edge of the valve member 40 (Figure 9) which disengages the dripping sealing liquid conducting it back to the body of the liquid without splashing. The bulk of the suspended sealing liquid is removed from the valve member during the oscillating movement and is prevented from being entrained in the pressure gases. Any particles carried in the outward movement of the relief pressure gases is recaptured in the vent 58 as described above and returned to the seal volume through pipe 64. This movement of the wiper 74 into contact with the trailing edge of the valve member also prevents the escaping gas from bubbling through the sealing liquid. The loss of sealing liquid caused by this spraying action is prevented. The condition exists until the valve member is clear of the liquid and the gas is free to escape without liquid contact.

The use of a wiping mechanism as here described, in which a wiping blade engages the trailing edge of the valve for a brief contact, has distinct operating advantages. A permanently fixed wiping surface will retard the valve member movement and prevent the prompt, positive action so desirable in valves of this type. In addition, a fixed wiper would prevent operation when stuck to the valve member and also require additional operating pressure to move the valve. The illustrated pressure responsive combination can be adjusted both operatively and in physical position, to contact the valve member after the oscillation has begun and consequently limited to brief but sufficient wiping action substantially free of any delay or friction.

After the excess pressure condition in the storage tank has been relieved, the support necessary to maintain connector 94 in sealing engagement with conduit 36 is no longer available. The actuator oscillating member returns to the normal position shown in Figure 5 in which conduit 36 is again opened to atmospheric pressure and conduit 34, through connection 32, is re-connected to tank pressures. The effect of this sudden change in the transmitted pressures in conduits 34 and 36 is to change the pressure conditions in the pressure responsive mechanism 42 as noted in Figure 3, driving the oscillating valve closed by reversing the differential pressure effects on the baffle 56. This acceleration of the closing movement and the positive pressure transmitted to keep the valve closed after the pressure venting operation is one of the advantages of the invention. This reversal of pressures is transmitted through the auxiliary conduits 76 and 78 to the wiper elements, forcing the blade 74 away from the valve member.

When an excess vacuum condition exists in the storage tank, it is transmitted immediately to the pressure responsive mechanism without any required movement of the actuator 30. Figure 5 shows the connector 86 in sealing engagement with the vacuum transmitting connecting conduit 32 which is coupled to conduit 34. In this position, the branch conduit 98 transmits a greater proportion of the vacuum condition to inverted cup 84 forcing the connector 86 into tighter engagement with conduit 32. Branch conduit 102 transmits the excess vacuum condition from the storage tank to the pressure responsive mechanism 42 through the conduit 34.

Figure 10:
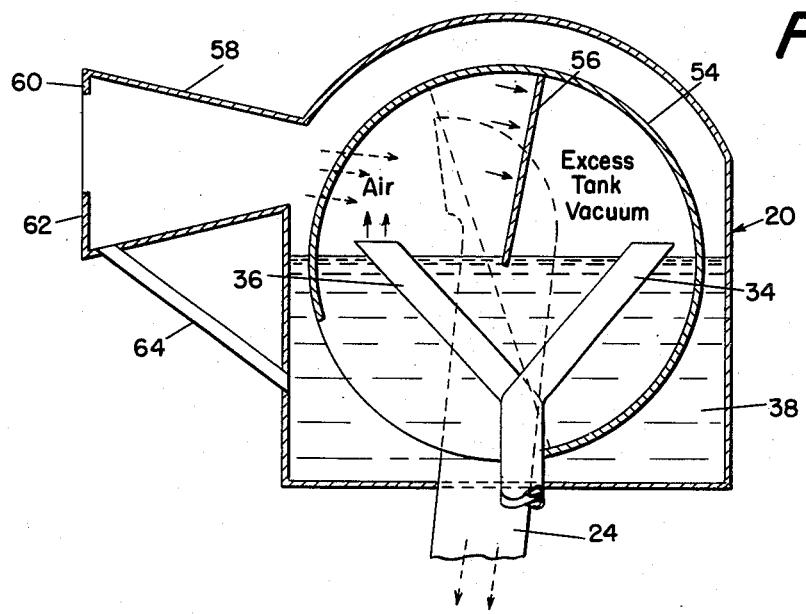

Figure 10 shows the positions assumed by the responsive elements for the differential pressure condition resulting from the transmission of the excess vacuum condition through the actuator as described. Conduit 36 being disengaged permits air at atmospheric pressure to be admitted below the baffle 56 in the pressure responsive mechanism, shown by arrows with solid lines, which oscillates the connected valve member in a clockwise direction against the excess vacuum pressure on the opposite side of the baffle. The pressure responsive mechanism and valve member as noted above are balanced to resist normal vacuum conditions less than those considered excessive, which requires relief movement only at predetermined negative pressures. This predetermined balance returns the valve member to the sealing position without further operation after the excess vacuum condition is relieved.

By maintaining the actuator in constant connection with the pressure responsive mechanism, the minimum vacuum requirement operates the valve immediately. This is in contrast with the restrained pressure venting which must be set as great as the strength of the storage vessel will permit. Thus a body of air brought into the receptacle by the relatively moderate vacuum condition is available for venting under pressure conditions covering the volatile constituents and cooling the tank contents.

It will be evident that a pressure operated relief valve is disclosed which greatly simplifies the structure of the operating elements yet retains all the desired operating characteristics for prompt and effective excess pressure and vacuum relief. The introduction of a pressure responsive wiper adapted for intermittent rather than continuous wiping action and a valve body designed to recapture entrained sealing liquid particles greatly reduces maintenance without altering these desired operating characteristics. The full tank pressure available is used to operate the valve, no force being lost in overcoming a balancing device. Finally, the prompt return to a permanently closed position of the valve member after relieving an excess pressure condition, eliminating hunting and chattering, is assured.

I claim:

1. A pressure relieving system for storage tanks comprising in combination, a housing adapted to contain liquid therein, a hollow semi-cylindrical oscillatory valve member pivotally suspended in the housing in sealing engagement with the liquid, a relieving conduit extending through the housing and liquid into the valve member above the liquid level; pressure activated wiping means in said housing including a fixed inverted cup positioned in sealing relation with the sealing liquid therein, a movable inverted cup in sealing relation with said liquid within said fixed cup, and a pivotally supported wiper blade operably connected to said movable cup in position to engage said valve member in wiping action; pressure responsive means forming a part of the valve member in the valve housing to require simultaneous movement thereof, said means including a hollow cylindrical chamber extending from the valve member having an opening thereto beneath the sealing liquid surface, and a radially disposed baffle therein positioned to divide the chamber into two sealed pressure receiving compartments; actuating means for transmitting operating pressures to said responsive means including a housing adapted to contain a sealing liquid, a pair of opposed pivotally supported inverted cups in sealing relation with said liquid, a pressure transfer conduit branched to extend through said liquid and actuator housing into the respective cups above the liquid level, and sealing connectors engaging said cups to transmit pressures therefrom; and two conduits positioned to operably engage said sealing connectors and extending into the separate compartments of the pressure responsive means whereby the operating pressures and the atmosphere are directed in operating relation to operate the valve and wiper blade.

2. An actuator for selecting pressures in the operation of pressure responsive mechanisms comprising a housing adapted to support a volume of sealing liquid therein, pressure transfer conduits extending through said housing and above the liquid in spaced relation, opposed inverted cups pivotally supported between the conduits in said housing in sealing relation therewith, and transmitting means including external seals having apertures therethrough opening into said cups for pressure transmission therefrom.

3. A pressure relief system for storage tanks comprising a vent valve operable to control the passage of relief gas therethrough; valve operating means connected to said valve and adapted to open the same in response to excess vacuum and pressure conditions; a pressure responsive actuator including a housing adapted to support a sealing liquid, pressure transfer conduits extending through the housing and the liquid in spaced relation, a pair of pressure receiving cups inverted to cover the conduits in sealing engagement with the liquid and pivotally supported between said conduits to oscillate in pressure transferring cooperation therewith, a pressure transmitting connector extending through the body of each cup to engage the sealing liquid and transmit pressure depending on the oscillatory position of the cup; and pressure conducting means for transmitting operating pressures to the valve operating means positioned to engage the connectors in the inverted cups during oscillation thereof.

4. A pressure relief system for storage tanks comprising a valve housing adapted to contain a liquid, a hollow inverted valve member supported in oscillatory sealing contact with said liquid; a pressure relieving conduit extending through the liquid and said housing into the hollow valve member above the liquid level; valve oscillating means connected to said valve member and adapted to operate the same in response to pressure; a pressure responsive actuator including a housing adapted to contain a liquid, a pair of inverted cups having pressure transmitting connections opening therefrom, said cups being fixed in spaced relation and pivoted therebetween to oscillate in sealing engagement with the liquid, pressure transfer conduits extending through said housing and the liquid to conduct pressure into the inverted cups; and conduit means positioned to engage the pressure transmitting connections on the pressure responsive oscillation of said inverted cups and conduct the pressure received from the engaging cup to the valve oscillating means for operation of the valve member.

5. The system described in claim 4 further characterized by said valve oscillating means including a chamber formed to extend in prolongation of the oscillatory valve member, said chamber being apertured beneath the sealing liquid for the passage of operating pressures therethrough, and a baffle in said chamber above the sealing liquid extending from the periphery of the chamber into engagement with the sealing liquid to divide the chamber into two compartments sealed to receive operating pressures.

6. The system described in claim 4 further characterized by said conduit means for transferring pressures from the cups of the actuator to the valve oscillating means including two conduits adapted to transmit excessive pressure and excessive vacuum conditions respectively when engaged by the cooperating cup transmitting connection and open to atmospheric pressures when disengaged, said conduits arranged to transmit atmospheric and operating pressure conditions to the valve oscillating means to operate the valve member in one direction for all pressure relieving operations.

7. The system described in claim 6 further characterized by a wiping device mounted in said valve housing to engage the valve member as it oscillates in one direction to relieve pressures, said device including an inverted cup in sealing contact with the liquid and fixed in the housing in proximity with the liquid disengaging edge of the valve member, a movable inverted cup within the fixed cup also in sealing engagement with the liquid, a wiper blade in operating engagement with the moving cup positioned to contact the disengaging edge of the valve member as it lifts from the sealing liquid, and branch conduits extending through the liquid into said cups connected to the two conduits for the transmission of the differential pressures to the valve oscillating means insuring synchronous movement of the wiper blade and valve member during the relieving operation.

References Cited in the file of this patent

UNITED STATES PATENTS

| | | |
|---|---|---|
| 1,069,136 | Herrick | Aug. 5, 1913 |
| 1,901,576 | Atwell | Mar. 14, 1933 |
| 2,371,961 | Ellis | Mar. 20, 1945 |
| 2,591,098 | Quist | Apr. 1, 1952 |